US012590568B2

(12) United States Patent
Kumar et al.

(10) Patent No.: US 12,590,568 B2
(45) Date of Patent: Mar. 31, 2026

(54) APPARATUSES AND METHODS FOR POWER CONTROL FOR WIND TURBINES

(71) Applicant: GE Infrastructure Technology LLC, Greenville, SC (US)

(72) Inventors: Amit Kumar, Stafford (GB); Carl Barker, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 110 days.

(21) Appl. No.: 18/429,689

(22) Filed: Feb. 1, 2024

(65) Prior Publication Data

US 2025/0084827 A1     Mar. 13, 2025

(30) Foreign Application Priority Data

Sep. 7, 2023    (EP) ..................................... 23196107

(51) Int. Cl.
F03D 7/02         (2006.01)
F03D 7/04         (2006.01)
              (Continued)

(52) U.S. Cl.
CPC ......... F03D 7/0272 (2013.01); F03D 7/0224 (2013.01); F03D 7/0244 (2013.01);
              (Continued)

(58) Field of Classification Search
CPC .... F03D 7/0272; F03D 7/0224; F03D 7/0244; F03D 7/028; F03D 7/048; F03D 13/126;
              (Continued)

(56) References Cited

U.S. PATENT DOCUMENTS 7,969,755 B2 *   6/2011   Davies ................... H02M 7/81
                                                363/35
9,932,966 B2 *   4/2018   Gomís Bellmunt .. F03D 7/0284
                  (Continued)

OTHER PUBLICATIONS

Extended European Search Report issued in EP Application No. 23196107.9 dated Jan. 29, 2024, 7 pages.

*Primary Examiner* — Tulsidas C Patel
*Assistant Examiner* — Thomas K Quigley
(74) *Attorney, Agent, or Firm* — Eversheds Sutherland (US) LLP

(57)        ABSTRACT

There is provided a control system for controlling power transmission associated with a first wind turbine. The control system is configured to: monitor an alternating current, AC, phase angle associated with the first wind turbine and/or monitor a rate of change of the AC phase angle associated with the first wind turbine; determine whether there is a change in the AC phase angle which is above a first threshold value and/or determine whether the rate of change of the AC phase angle is above a second threshold value; and in response to determining that there is a change in the AC phase angle which is above the first threshold value and/or the rate of change of the AC phase angle is above the second threshold value, cause the first wind turbine to operate its dynamic braking system, DBS, to reduce an instantaneous power output of the first wind turbine.

19 Claims, 4 Drawing Sheets

(51) Int. Cl.
  *F03D 13/10*    (2016.01)
  *H02J 101/28*    (2026.01)

(52) U.S. Cl.
  CPC ............. *F03D 7/028* (2013.01); *F03D 7/048*
    (2013.01); *F03D 13/126* (2023.08); *F05B*
   *2260/70* (2013.01); *F05B 2260/90* (2013.01);
    *F05B 2270/1033* (2013.01); *H02J 2101/28*
              (2026.01)

(58) Field of Classification Search
  CPC ............. H02J 2300/28; F05B 2260/70; F05B
        2260/90; F05B 2270/1033
  See application file for complete search history.

(56)       References Cited

U.S. PATENT DOCUMENTS

| | | | |
|---|---|---|---|
| 10,739,396 B2 * | 8/2020 | Biswas | G01R 25/005 |
| 11,942,790 B2 * | 3/2024 | Jasim | H02J 3/36 |
| 12,149,085 B1 * | 11/2024 | Offergeld | H02J 3/36 |
| 12,149,156 B1 * | 11/2024 | Koliwad | H02J 3/36 |
| 12,272,955 B2 * | 4/2025 | Babu Narayanan | H02J 3/40 |
| 2008/0205093 A1 * | 8/2008 | Davies | H02M 7/49 |
| | | | 363/35 |
| 2008/0252142 A1 * | 10/2008 | Davies | H02M 7/4835 |
| | | | 307/42 |
| 2021/0047997 A1 * | 2/2021 | Abeyasekera | F03D 7/026 |
| 2023/0028868 A1 * | 1/2023 | Jasim | H02J 3/48 |
| 2023/0140103 A1 | 5/2023 | Babu Narayanan | |
| 2023/0223759 A1 * | 7/2023 | Babu Narayanan | H02J 3/40 |
| | | | 307/82 |

\* cited by examiner

APPARATUSES AND METHODS FOR POWER CONTROL FOR WIND TURBINES

TECHNICAL FIELD

This invention relates to wind turbines and methods of providing power control for wind turbines.

BACKGROUND

Offshore wind turbines are typically connected to an onshore AC grid via an offshore interconnection scheme in order to transmit power generated by the offshore wind turbines to the onshore AC grid. One type of known offshore interconnection scheme is a meshed configuration. It is desirable to be able to deal with faults in the meshed configuration interconnection scheme for wind turbine power transmission.

SUMMARY

In an aspect of the invention, there is provided a control system for controlling power transmission associated with a first wind turbine in a power transmission system. The control system is configured to: monitor an alternating current, AC, phase angle of an electrical connection between the first wind turbine and a first power converter associated with the first wind turbine and/or monitor a rate of change of the AC phase angle of the electrical connection between the first wind turbine and the first power converter; determine whether there is a change in the AC phase angle which is above a first threshold value and/or determine whether the rate of change of the AC phase angle is above a second threshold value; and in response to determining that there is a change in the AC phase angle which is above the first threshold value and/or the rate of change of the AC phase angle is above the second threshold value, cause the first wind turbine to operate its dynamic braking system, DBS, to reduce an instantaneous power output of the first wind turbine.

The control system may be further configured to reduce a steady-state power output of the first wind turbine to be below a defined limit.

The control system may be further configured to determine the reduction in instantaneous power output of the first wind turbine based on a number of HVDC links to which the first wind turbine is connected and/or based on a number of HVDC points of common coupling in the power transmission system.

The control system may be further configured to maintain the limited power output of the first wind turbine by reducing an amount of energy dissipated by the DBS as an amount of mechanical input power is reduced by blade pitch control of the first wind turbine.

The control system may be further configured to: detect an increase in an instantaneous power input of the first power converter; and in response to detecting the increase in the instantaneous power input of the first power converter, adjust a phase angle of the first power converter to oppose the increase in the instantaneous power input of the first power converter.

The first power converter may operate in a grid-forming mode.

The control system may comprise a plurality of different controllers.

The plurality of different controllers may comprise a wind turbine controller, a power converter controller, and a supervisory controller.

In another aspect of the invention, there is provided a power transmission system comprising: the control system of the above aspect; the first wind turbine; the first power converter; a second wind turbine; and a second power converter. The first wind turbine is electrically connected to the first power converter via a first electrical connection to supply power to the first power converter. The second wind turbine is electrically connected to the second power converter via a second electrical connection to supply power to the second power converter. The first wind turbine is electrically connectable to the second power converter via a third electrical connection separate to the first and second electrical connections such that, in response to a failure in the first electrical connection, the power which would otherwise have been supplied via the first electrical connection is instead re-directed through the second electrical connection via the third electrical connection.

The first and/or second wind turbine may be one of multiple wind turbines electrically connected to a common AC busbar in a wind farm arrangement, and wherein the windfarm arrangement is connected to an onshore AC electrical power grid via a High Voltage Direct Current, HVDC, link.

The first and second electrical connections may be HVDC links.

The third electrical connection may comprise an impedance.

The impedance may be provided at least in part by an inductive element in each of the AC phases.

The first and second wind turbines may be offshore wind turbines and the first and second power converters may be offshore power converters of HVDC links.

In yet another aspect of the invention, there is provided a method performed by a control system for controlling power transmission associated with a first wind turbine in a power transmission system, the method comprising: monitoring an alternating current, AC, phase angle of an electrical connection between the first wind turbine and a first power converter associated with the first wind turbine and/or monitoring a rate of change of the AC phase angle of the electrical connection between the first wind turbine and the first power converter; determining whether there is a change in the AC phase angle which is above a first threshold value and/or determining whether the rate of change of the AC phase angle is above a second threshold value; and in response to determining that there is a change in the AC phase angle which is above the first threshold value and/or the rate of change of the AC phase angle is above the second threshold value, causing the first wind turbine to operate its dynamic braking system, DBS, to reduce an instantaneous power output of the first wind turbine.

BRIEF DESCRIPTION OF THE DRAWINGS

There now follows a brief description of preferred embodiments of the invention, by way of non-limiting example, with reference being made to the following figures in which.

DETAILED DESCRIPTION

Figures 1A, 1B:
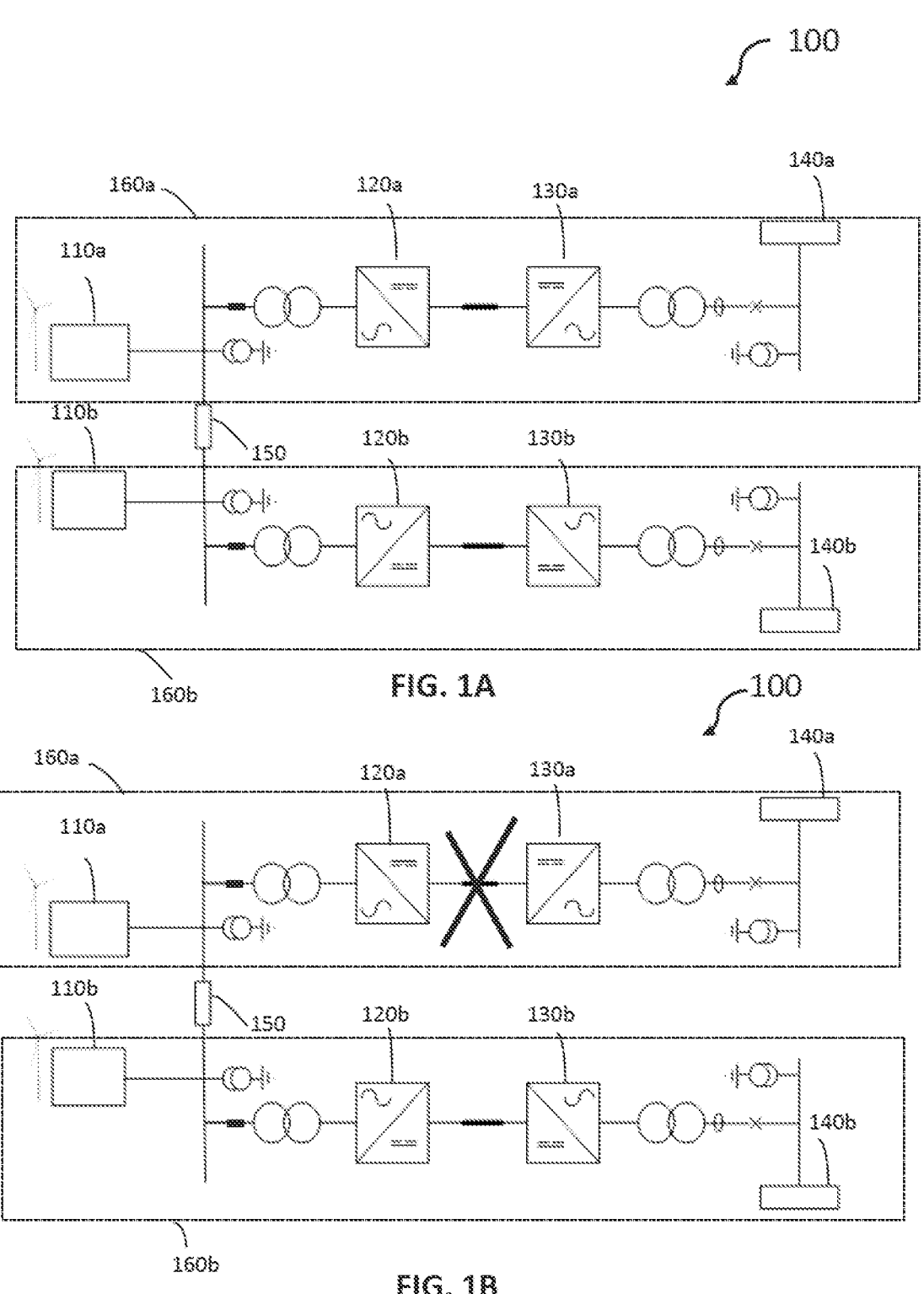
FIG. 1A shows a schematic view of a wind turbine power transmission system in a meshed configuration operating in a first state.
FIG. 1B shows a schematic view of the wind turbine power transmission system of FIG. 1A operating in a second state.

FIG. 1A shows a schematic view of a wind turbine power transmission system 100 in a meshed configuration. The wind turbine power transmission system 100 is a High Voltage Direct Current (HVDC) power transmission system. The wind turbine power transmission system 100 comprises a first wind turbine 110a, a second wind turbine 110b, a first AC-DC power converter 120a, a second AC-DC power converter 120b, a first DC-AC power converter 130a, a second DC-AC power converter 130b, a first point of common coupling 140a, a second point of common coupling 140b, and an interconnection 150. The first wind turbine 110a, first AC-DC power converter 120a, first DC-AC power converter 130a and first point of common coupling 140a together form a first HVDC power transmission line 160a for transmitting electrical power generated by the first wind turbine 110a to the first point of common coupling 140a. The second wind turbine 110b, second AC-DC power converter 120b, second DC-AC power converter 130b and second point of common coupling 140b together form a second HVDC power transmission line 160b for transmitting electrical power generated by the second wind turbine 110b to the second point of common coupling 140b. The first and second HVDC power transmission lines 160a, 160b are electrically connected to each other via an interconnection 150 between the first and second HVDC power transmission lines.

In the first HVDC power transmission line 160a, the first wind turbine 110a is serially electrically connected to the first point of common coupling 140a via the first AC-DC power converter 120a and the first DC-AC power converter 130a. The first AC-DC power converter 120a is configured to convert AC power generated by the first wind turbine 110a into DC power for HVDC transmission. The first DC-AC power converter 130a is configured to convert the DC power which has been transmitted via HVDC transmission back into AC power for supply to an AC grid. Similarly, in the second HVDC power transmission line 160b, the second wind turbine 110b is serially electrically connected to the second point of common coupling 140b via the second AC-DC power converter 120b and the second DC-AC power converter 130b. The second AC-DC power converter 120b is configured to convert AC power generated by the second wind turbine 110b into DC power for HVDC transmission. The second DC-AC power converter 130b is configured to convert the DC power which has been transmitted via HVDC transmission back into AC power for supply to an AC grid.

The interconnection 150 is connected to the first HVDC power transmission line 160a at a point between the first wind turbine 110a and the first AC-DC power converter 120a, and connected to the second HVDC power transmission line 160b at a point between the second wind turbine 110b and the second AC-DC power converter 120b. The interconnection 150 has an impedance. The impedance may be provided at least in part by an inductive element in each of the AC phases.

In this example, the power transmission system 100 is an offshore power transmission system with the first and second wind turbines 110a, 110b being offshore wind turbines. However, it will be appreciated that, in other examples, the power transmission system 100 may be an onshore power transmission system instead, with the first and second wind turbines 110a, 110b being onshore wind turbines. Furthermore, in this example, only two wind turbines and their associated HVDC power transmission lines are shown. However, it will be appreciated that, in general, there may be any number of wind turbines and associated HVDC power transmission lines all interconnected in the same manner as shown in the embodiment of FIG. 1A.

In a normal first state of operation, power generated by the first wind turbine 110a is transmitted down the first power transmission line 160a, power generated by the second wind turbine 110b is transmitted down the second power transmission line 160b, and a steady-state amount of power is transmitted down the interconnection 150. The steady-state amount of power transmitted down the interconnection 150 may be zero, substantially zero, or a defined amount set by an operator of the power transmission system 100.

FIG. 1B shows a schematic view of the wind turbine power transmission system 100 of FIG. 1A operating in a second state of operation.

In the second state of operation, there is a fault in the first HVDC power transmission line 160a which prevents power transmission down the first HVDC power transmission line 160a. In this scenario, power generated by the first wind turbine 110a is routed down the interconnection 150 and transmitted down the second HVDC power transmission line 160b instead. Thus, there is an increase in the amount of power the power transmission system 100 is attempting to transmit down the second HVDC power transmission line 160b. However, this increase in power tends to be problematic because the power converters, 120a, 120b, 130a, 130b of the system 100 are not designed to withstand increases in power beyond their rating and the total power from the first wind turbine 110a plus the second wind turbine 110b may exceed this limit. Thus, in the state of operation illustrated by FIG. 1B, where the total power from the first wind turbine 110a plus the second wind turbine 110b exceeds the capacity of the second AC-DC power converter 120b or the second DC-AC power converter 130b, then the second AC-DC power converter 120b is configured to curtail its power input (by reducing its AC voltage) in order to prevent power overload. As a consequence, there is a sudden reduction in the total power flow through the second HVDC power transmission line 160b.

It will be appreciated that although FIGS. 1A and 1B show only one wind turbine 110a, 110b in each HVDC power transmission line 160a, 160b, there may be more than one wind turbine in each HVDC power transmission line 160a, 160b. For example, the first and second wind turbines 110a, 110b may each be one of multiple wind turbines connected to a common AC busbar in a wind farm arrangement. In other words, instead of a single wind turbine as depicted in FIGS. 1A and 1B, each of the first and second HVDC power transmission lines 160a, 160b may have multiple wind turbines arranged in a wind farm arrangement connected to the rest of the HVDC line. Furthermore, it will be appreciated that there may be one or more additional HVDC power transmission lines in addition to the first and second HVDC power transmission lines 160a, 160b shown in FIGS. 1A and 1B. In other words, rather than there only being two HVDC power transmission lines as shown in FIGS. 1A and 1B, there may be three or more HVDC power transmission lines connected together in the same manner as shown for the first and second HVDC power transmission lines 160*a*, 160*b*. More specifically, each additional HVDC power transmission line may be connected to the other HVDC power transmission lines via a respective additional interconnection in the same manner as the interconnection 150 described with reference to FIGS. 1A and 1B. Each additional HVDC power transmission lines may comprise one or more additional wind turbines connected to respective additional power converters and a respective additional point of common coupling in the same way as described above for each of the first and second HVDC power transmission lines 160*a*, 160*b*.

Figure 2:
FIG. 2 shows a schematic view of a wind turbine and some of its internal components.
Figure 2:
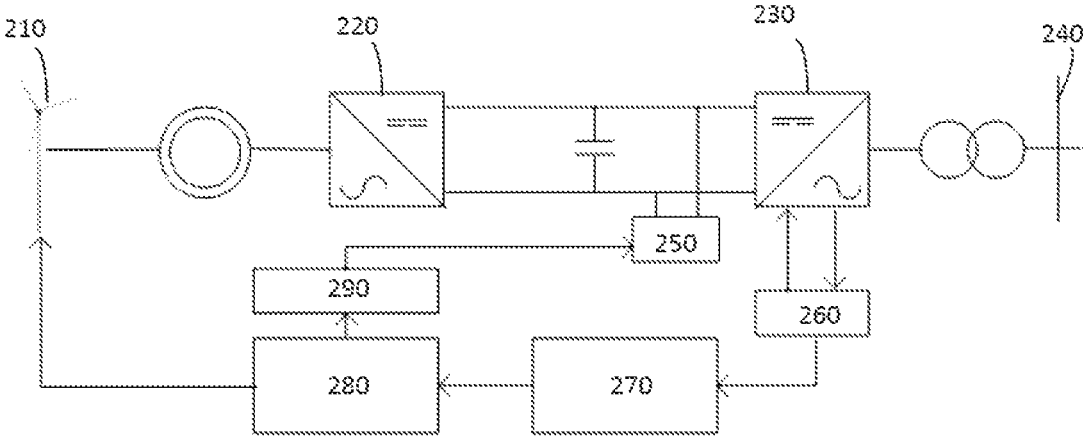

FIG. 2 shows a schematic view of a wind turbine 200 and some of its internal components. The wind turbine 200 may be used as one of the wind turbines in a power transmission system such as the one labelled 110*a* illustrated by FIGS. 1A and 1B.

The wind turbine 200 comprises wind turbine blades 210, an AC-DC converter 220, a DC-AC converter 230, power output point 240, a dynamic braking system (DBS) 250, a controller 260, a phase derivative detector 270, a power limiting function 280 and a DBS control function 290.

The wind turbine blades 210 are configured to turn to generate power which is supplied to the power output point 240 via the AC-DC converter 220 and the DC-AC converter 230. The power output point 240 is connected the rest of the power transmission system, i.e. to one or more HVDC power transmission links in the manner shown in FIGS. 1A and 1B.

The DBS 250 is configured to reduce a power output of the wind turbine 200 when active. In this embodiment, the DBS is connected between the AC-DC converter 220 and the DC-AC converter 230.

The controller 260 is configured to monitor and control other components of the wind turbine 200, e.g. the DBS 250, the wind turbine blades 210, the AC-DC converter 220 and the DC-AC converter 230. The controller 260 is also configured to monitor AC quantities (e.g. AC voltage and/or current) on the AC side of the DC-AC converter 230.

The phase derivative detector 270 is a control function which the controller 260 is configured to execute. When executed by the controller 260, the phase derivative detector 270 causes the controller to detect/determine the rate of change in phase angle of the AC voltage measured at the output point 240.

The power limiting function 280 and DBS control function 290 are also software control functions which the controller 260 is configured to execute to control the wind turbine blades 210 and the DBS 250, respectively. The power limiting function 280, when executed, causes blade pitch control of the wind turbine blades 210 to be performed, in order to alter the amount of power generated by the wind turbine 200. The DBS control function 290, when executed, causes the DBS to activate to reduce the power output of the wind turbine 200.

The way in which the wind turbine 200 operates in the scenario illustrated in FIG. 1B will now be described.

When a fault occurs on one of the HVDC power transmission lines such that power cannot be transferred down that HVDC line, the other HVDC power transmission line(s) experience a rapid increase in the amount of power the system is trying to transmit down it, due to the power being transmitted via the interconnection between the HVDC power transmission lines described above with reference to FIGS. 1A and 1B. The occurrence of this is detected by the wind turbine 200 (specifically the wind turbine controller 260) in the following manner.

Power flow from the wind turbine 200 into the rest of the power transmission system can be described by the following equation:

$$P = \frac{V1 \cdot V2}{X} \cdot \sin(\delta_2 - \delta_1)$$

Where:

P is the power transferred

X is the impedance between a first node and a second node $V_1$ is the voltage at the first node $V_2$ is the voltage at the second node $\delta_1$ is the phase angle at the first node $\delta_2$ is the phase angle at the second node Typically, $V_1$ and $V_2$ are approximately 1 pu and X is a fixed, physical quantity. Hence, the power flow P is predominantly controlled by the phase angle $\delta$ between the first and second nodes.

In the power transmission system described herein, the HVDC converters (e.g. the ones labelled 120*a*, 120*b* in FIGS. 1A and 1B) typically operate in a "grid forming" mode where they create an AC voltage vector, controlling the magnitude, frequency and phase through an associated HVDC controller (not shown).

The converters of the wind turbine 200 (i.e. the ones labelled 220, 230 in FIG. 2) operate in a "grid following" mode, in which the wind turbine controller 260 locks onto the AC voltage vector present at the power output point 240 (i.e. the point of connection to the rest of the power transmission system) and follow this but with a phase angle difference that results in an active power flow. The source of the active power is the mechanical rotation of the wind turbine blades 210. The wind turbine controller 260 is configured to automatically adjust the phase angle of the AC voltage vector that it generates with respect to that of the rest of the power transmission system at the power output point 240, in order to export the energy being mechanically generated by the wind turbine 200. The wind turbine controller 260 is therefore able to extract a measure related to the phase angle of the AC output voltage by the wind turbine 200. For example, the phase angle of the AC output voltage may be directly measured by the controller 260 at the output point 240, or the phase angle of the AC output voltage may be derived by the controller 260 by measuring internal parameters of the converters 220, 230. This advantageously allows the wind turbine controller 260 to work out when a fault has occurred in an HVDC line and thus take remedial action at the wind turbine side of the system.

Specifically, the wind turbine controller 260 is configured to monitor an AC phase angle of the output voltage from the DC-AC converter 230. Additionally or alternatively, the wind turbine controller 260 is configured to monitor a rate of change of the AC phase angle of the output voltage from the DC-AC converter 230 (e.g. via the phase derivative detector 270).

The wind turbine controller 260 is further configured to determine whether there is a change in the AC phase angle which is above a first threshold value. Additionally or alternatively, the wind turbine controller 260 is configured to determine whether the rate of change of the AC phase angle is above a second threshold value. In response to determining that the AC phase angle is above the first threshold value and/or the rate of change of the AC phase angle is above the second threshold value, the wind turbine controller 260 is configured to cause the wind turbine 200 to operate its DBS 250 (via the DBS control function 290) to reduce an instantaneous power output of the wind turbine 200.

The wind turbine controller 260 is further configured to reduce a steady-state power output of the wind turbine 200 to be below a defined limit. The defined limit of the steady-state power output of the wind turbine 200 is determined based on a number of HVDC links to which the wind turbine 200 is connected. The defined limit may be determined by a separate supervisory controller (not shown) of the power transmission system and communicated to the wind turbine controller 260. Alternatively, the defined limit may be calculated by the wind turbine controller 260. For example, the defined limit may be calculated as a function of a persistent change in the AC phase angle measured by the wind turbine controller 260.

The wind turbine controller 260 is further configured to maintain the limited power output of the wind turbine 200 by reducing an amount of energy dissipated by the DBS 250 as an amount of mechanical input power is reduced by blade pitch control of the wind turbine blades 210 of the wind turbine 200. In other words, the more that the mechanical input power of the wind turbine 200 is reduced by blade pitch control, the more the wind turbine controller 260 reduces the amount of the energy dissipated by the DBS 250, in order to maintain the power output at the defined limit. The blade pitch control is initiated by the wind turbine controller 260 via the power limiting function 280 at the same time as the DBS is activated.

In addition to the control functions performed by the wind turbine controller 260, an HVDC controller (not shown) of an HVDC power converter (e.g. the one labelled 120b in FIGS. 1A and 1B) connected to the wind turbine 200 is also configured to perform control functions to help deal with the fault in the system. Specifically, the HVDC controller is configured to detect an increase in an instantaneous power input of the HVDC power converter, and in response to detecting the increase in the instantaneous power input of the HVDC power converter, adjust a phase angle of the HVDC power converter to oppose the increase in the instantaneous power input of the HVDC power converter. This adjustment of the phase angle forces changes in the phase angle of the wind turbines connected to the HVDC power converter. However, for wind turbines connected via the interconnection, to overcome the impedance of the interconnection, the phase angle of a wind turbine connected via the interconnection (e.g. wind turbine 110a in FIGS. 1A and 1B) will change more compared to the phase angle of a wind turbine (e.g. wind turbine 110b in FIGS. 1A and 1B) which is not connected through the interconnection. Hence, the wind turbine which is connected via the interconnection will react faster and reduce its power output by triggering its DBS before a wind turbine which is not connected through the interconnection does. Thus, the above-described adjustment of the phase angle by the HVDC controller can be used to help trigger the DBS 250 of the wind turbine 200 as described above with reference to FIG. 2.

Advantageously, the above-described functions help allow the above-described wind turbine power transmission system to maintain its power transfer throughput and to pick-up power generation from wind turbine(s) associated with a blocked or faulty HVDC link, whilst avoiding overloading the healthy HVDC links, and therefore avoiding curtailment of the healthy HVDC links.

Figure 3:
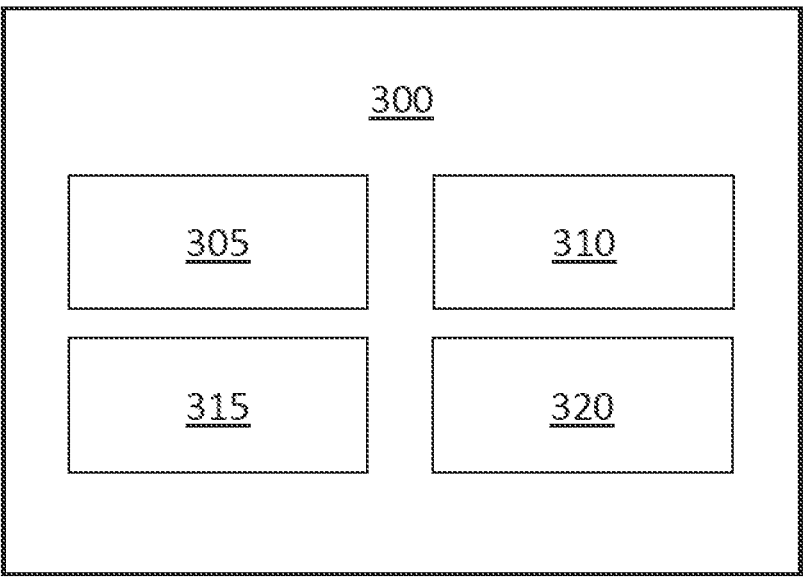
FIG. 3 shows a schematic view of a controller structure for controllers of the wind turbine power transmission system.

FIG. 3 shows a schematic view of a controller 300 that may be used for implementing the methods described herein. The controller 300 may be the wind turbine controller, the supervisory controller or the HVDC controller described above.

The controller 300 may be one implementation of the controller illustrated in FIG. 2. The controller 300 includes a processor 305, a memory 310, an input device 315, and an output device 320.

The processor 305 may include any known controller capable of executing computer-readable instructions and/or capable of performing logical operations. For example, the processor 305 may be a microcontroller, a microprocessor, a CPU, a GPU, an auxiliary processing unit, a FPGA, or similar programmable controller. The processor 305 may execute instructions stored in the memory 310 to perform the methods and routines described herein. The processor 305 is communicatively coupled to the memory 310, the input device 315, and the output device 320.

The memory 310 may be a computer readable storage medium. The memory 310 may include volatile computer storage media. For example, the memory 310 may include a RAM, including dynamic RAM ("DRAM"), synchronous dynamic RAM ("SDRAM"), and/or static RAM ("SRAM"). The memory 310 may include non-volatile computer storage media. For example, the memory 310 may include a hard disk drive, a flash memory, or any other suitable non-volatile computer storage device. The memory 310 may include both volatile and non-volatile computer storage media.

The memory 310 may store data related to wind turbine operation. For example, the memory 310 may store parameters and/or configurations and the like for controlling wind turbine operation. The memory 310 may also store program code and related data, such as an operating system or other controller algorithms operating on the controller 300.

The input device 315 is configured to receive signals from other parts of the system for use in controlling various aspects of the system. The output device 320 is configured to output signals to other parts of the system for controlling various aspects of the system.

Figure 4:
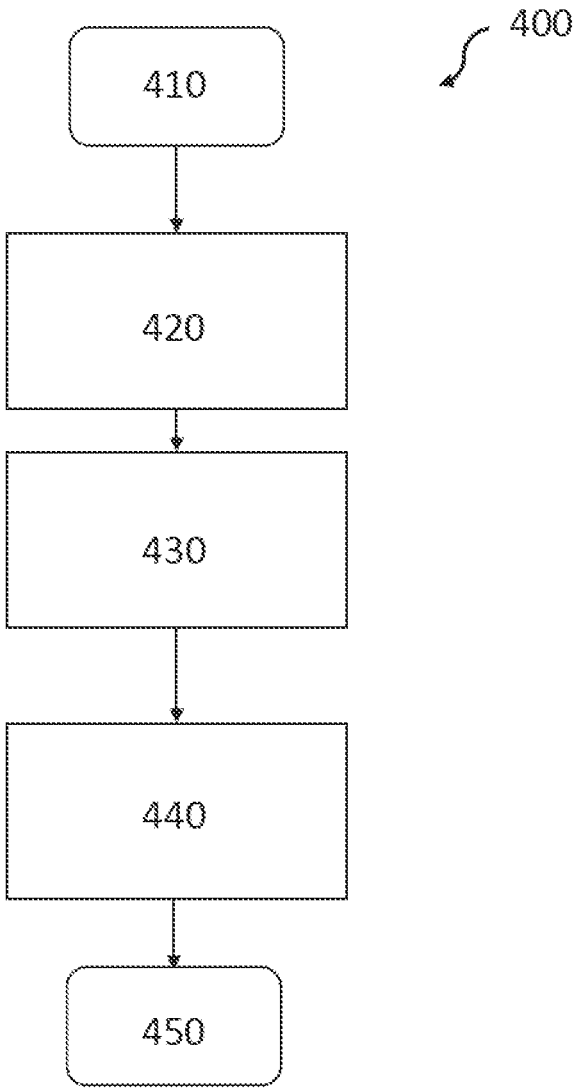
FIG. 4 shows a flowchart illustrating steps performed by a wind turbine controller.

FIG. 4 shows a flowchart of a method performed by the wind turbine controller 250 of FIG. 2.

At step 410, the method starts.

At step 420, the controller monitors an alternating current, AC, phase angle of an electrical connection associated with a first wind turbine. Additionally, or alternatively, the controller monitors a rate of change of the AC phase angle of the first wind turbine.

At step 430, the controller determines whether there is a change in the AC phase angle which is above a first threshold value. Alternatively, or additionally, the controller determines whether the rate of change of the AC phase angle is above a second threshold value.

At step 440, in response to determining that the change in AC phase angle is above the first threshold value and/or the rate of change of the AC phase angle is above the second threshold value, the controller causes the first wind turbine to operate its dynamic braking system, DBS, to reduce an instantaneous power output of the first wind turbine.

At step 450, the method ends.

It will be appreciated that the use of the terms "first" and "second", and the like, in this patent specification is merely intended to help distinguish between similar features (e.g. the first and second transmission conduits, and the first and second converter stations), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

We claim:

1. A control system of a wind turbine for controlling power transmission associated with the wind turbine in a power transmission system, the control system configured to:

monitor, by processing circuitry of a wind turbine configured to provide power to an alternating current (AC) grid via high-voltage direct current (HVDC) transmission lines, an AC phase angle of an output voltage of the wind turbine and/or monitor a rate of change of the AC phase angle, wherein the AC phase angle is indicative of an active power generated by the wind turbine;

determine, by the processing circuitry, whether there is a change in the AC phase angle which is above a first threshold value and/or determine whether the rate of change of the AC phase angle is above a second threshold value, wherein the change in the AC phase angle and/or the rate of change in the AC phase angle is indicative of a change in impedance of an interconnection between the HVDC transmission lines; and in response to determining that there is a change in the AC phase angle which is above the first threshold value and/or the rate of change of the AC phase angle is above the second threshold value, cause, by the processing circuitry, the wind turbine to operate its dynamic braking system (DBS) to reduce an instantaneous power output of the wind turbine.

2. The control system of claim 1, wherein the control system is further configured to reduce a steady-state power output of the wind turbine to be below a defined limit.

3. The control system of claim 2, wherein the control system is further configured to determine the reduction in the instantaneous power output of the wind turbine based on a number of HVDC links to which the wind turbine is connected and/or based on a number of HVDC points of common coupling in the power transmission system.

4. The control system of claim 1, wherein the control system is further configured to maintain the limited power output of the wind turbine by reducing an amount of energy dissipated by the DBS as an amount of mechanical input power is reduced by blade pitch control of the wind turbine.

5. The control system of claim 1, further configured to:

detect, by processing circuitry of an HVDC controller, an increase in an instantaneous power input of a power converter electrically connected to the wind turbine; and in response to detecting the increase in the instantaneous power input of the power converter, adjust, by the processing circuitry of the HVDC controller, a phase angle of the power converter to oppose the increase in the instantaneous power input of the power converter.

6. The control system of claim 5, wherein the power converter operates in a grid-forming mode.

7. The control system of claim 1, comprising a plurality of different controllers.

8. The control system of claim 7, wherein the plurality of different controllers comprises a wind turbine controller, a power converter controller, and a supervisory controller.

9. A power transmission system comprising:

the control system of claim 1;

the wind turbine;

a first power converter;

a second wind turbine; and a second power converter, wherein the wind turbine is electrically connected to the first power converter via a first electrical connection to supply power to the first power converter, wherein the second wind turbine is electrically connected to the second power converter via a second electrical connection to supply power to the second power converter, wherein the wind turbine is electrically connectable to the second power converter via a third electrical connection separate to the first and second electrical connections such that, in response to a failure in the first electrical connection, the power which would otherwise have been supplied via the first electrical connection is instead re-directed through the second electrical connection via the third electrical connection.

10. The power transmission system of claim 9, wherein the and/or second wind turbine is one of multiple wind turbines electrically connected to a common AC busbar in a wind farm arrangement, wherein the wind farm arrangement is connected to the AC grid, and wherein the AC grid is an onshore AC electrical power grid connected to the wind farm arrangement via a HVDC link.

11. The power transmission system of claim 9, wherein the first and second electrical connections are HVDC links.

12. The power transmission system of claim 1, wherein the change in the impedance is based on a fault.

13. The power transmission system of claim 9, wherein the wind turbine and the second wind turbine are offshore wind turbines and the first and second power converters are offshore power converters of HVDC links.

14. A method performed by a control system of a wind turbine for controlling power transmission associated with the wind turbine in a power transmission system, the method comprising:

monitoring, by processing circuitry of a wind turbine configured to provide power to an alternating current (AC) grid via high-voltage direct current (HVDC) transmission lines, an AC phase angle of an output voltage of the wind turbine and/or monitoring a rate of change of the AC phase angle, wherein the AC phase angle is indicative of an active power generated by the wind turbine;

determining, by the processing circuitry, whether there is a change in the AC phase angle which is above a first threshold value and/or determining whether the rate of change of the AC phase angle is above a second threshold value, wherein the change in the AC phase angle and/or the rate of change in the AC phase angle is indicative of a change in impedance of an interconnection between the HVDC transmission lines; and in response to determining that there is a change in the AC phase angle which is above the first threshold value and/or the rate of change of the AC phase angle is above the second threshold value, causing, by the processing circuitry, the first wind turbine to operate its dynamic braking system (DBS) to reduce an instantaneous power output of the first wind turbine.

15. The method of claim 14, further comprising:

reducing a steady-state power output of the wind turbine to be below a defined limit.

16. The method of claim 15, further comprising:

determining the reduction in the instantaneous power output of the wind turbine based on a number of HVDC links to which the wind turbine is connected and/or based on a number of HVDC points of common coupling in the power transmission system.

17. The method of claim 14, further comprising:

maintaining the limited power output of the wind turbine by reducing an amount of energy dissipated by the DBS as an amount of mechanical input power is reduced by blade pitch control of the wind turbine.

18. The method of claim 14, further comprising:

detecting, by processing circuitry of an HVDC controller, an increase in an instantaneous power input of a power converter electrically connected to the wind turbine; and in response to detecting the increase in the instantaneous power input of the power converter, adjusting, by the processing circuitry of the HVDC controller, a phase angle of the power converter to oppose the increase in the instantaneous power input of the power converter.

19. The method of claim 14, wherein the change in impedance in based on a fault.

\* \* \* \* \*